United States Patent [19]

Numazawa et al.

[11] 4,406,176
[45] Sep. 27, 1983

[54] STEERING SHAFT SUPPORT DEVICE

[75] Inventors: Akio Numazawa, Nagoya; Taketo Matoba; Makoto Kida, both of Toyota, all of Japan

[73] Assignee: Toyota Jidosha Kogyo Kabushiki Kaisha, Toyota, Japan

[21] Appl. No.: 198,064

[22] Filed: Oct. 17, 1980

Related U.S. Application Data

[62] Division of Ser. No. 44,191, May 31, 1979, Pat. No. 4,277,984.

[30] Foreign Application Priority Data

Feb. 26, 1979 [JP] Japan .................................. 54-20778
Feb. 26, 1979 [JP] Japan .................................. 54-20779

[51] Int. Cl.³ ........................ B62D 1/18; F16C 35/067
[52] U.S. Cl. ..................................... 74/492; 280/779; 308/184 R; 308/189 R
[58] Field of Search ............ 74/492, 493; 308/184 R, 308/189 R; 280/779

[56] References Cited

U.S. PATENT DOCUMENTS

| | | | |
|---|---|---|---|
| 1,875,719 | 9/1932 | Ferguson | 308/236 |
| 1,964,061 | 6/1934 | Insley et al. | 308/189 R X |
| 1,965,729 | 7/1934 | Tessky | 308/236 X |
| 2,271,336 | 2/1942 | Goldsmith | 308/236 |
| 3,468,182 | 9/1969 | Schwartzberg | 74/492 |
| 3,481,655 | 12/1969 | Campbell | 308/184 R |
| 3,791,233 | 2/1974 | Bane | 74/492 |
| 4,098,141 | 7/1979 | Yamaguchi | 74/497 |

*Primary Examiner*—Allan D. Herrmann
*Attorney, Agent, or Firm*—Finnegan, Henderson, Farabow, Garrett & Dunner

[57] ABSTRACT

In a rack and pinion type steering system with an energy absorbing mechanism, errors in axial dimensions of the steering shaft and column tube often make it difficult to fix the two parts to each other at two predetermined axially spaced positions. Such difficulty is eliminated by providing an elongated slot of a predetermined axial length in the column tube to allow a holding member to extend radially through the slot irrespective of the dimensional errors to fixedly connected the column tube to the steering shaft. In addition, a support member which is mounted on the steering shaft for assembling a bearing thereon is constituted by a single structure to preclude disconnection or disintegration of component parts caused by the thrust acting thereon and provided with claw portions or caulking wall portions for holding the bearing securely in position.

3 Claims, 12 Drawing Figures

F I G. 10
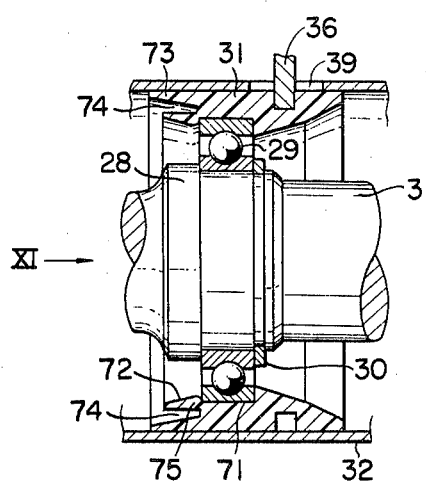
F I G. 11
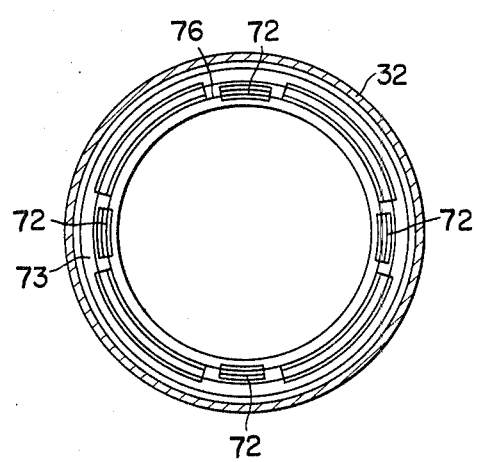
F I G. 12
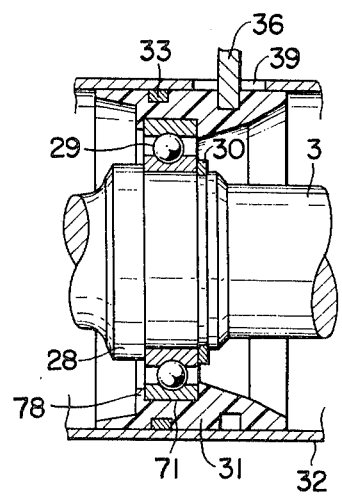

STEERING SHAFT SUPPORT DEVICE

This is a division of application Ser. No. 044,191 filed May 31, 1979, now U.S. Pat. No. 4,277,984.

BACKGROUND OF THE INVENTION (1) Field of the Invention

This invention relates to a steering shaft support device useful for a steering column assembly in which the steering shaft is required to be supported at two axially spaced positions as in rack and pinion type steering system.

(2) Description of the Prior Art

In the rack and pinion type steering system, radial loads are applied to the lower end of the steering shaft, so that it is necessary to support the steering shaft at two axially spaced positions.

On the other hand, a shock absorbing type steering system which is designed to absorb the collisional energy through the steering shaft is generally provided with a shear pin to permit contraction of the steering shaft in the axial direction in the event of a vehicle collision. The steering shaft, however, is also subjected to axial thrust loads from time to time except other than on the occasion of vehicle collision or crash, so that it has to be fixed in the axial direction relative to and on opposed sides of the shear pin.

Therefore, in a rack and pinion type steering column assembly with an energy absorbing mechanism, it is necessary to support the steering shaft at two axially distant positions to provide support in both radial and axial directions.

However, axial dimensional errors of the column tube and steering shaft which occur during the manufacturing process make the fixation at two axial positions difficult or almost impossible due to misalignment of the fixing members on the steering shaft and column tube simultaneously at two different positions.

SUMMARY OF THE INVENTION

The primary object of the present invention is to provide a steering shaft support device which can suitably fix the steering shaft to the column tube at two axially separate positions irrespective of the errors in axial dimensions occurring during the manufacturing process.

In order to fix the steering shaft to the column tube in the axial direction and at the same time to receive the radially acting force of the steering shaft by the column tube, there is provided a support member which is fixed on the steering shaft through a bearing and inserted in and fixed to the column tube through a suitable holding member. The conventional counterpart of the support member is axially or circumferentially split into two parts which are coupled with each other after mounting the bearing on the steering shaft. The conventional support member of such construction has a possibility or suffers from a trouble of the support member falling apart under the influence of the thrust action thereon.

It is a second object of the present invention to provide a steering shaft support device which precludes separation of the support member due to thrust forces.

The above-mentioned primary object is achieved by providing an elongated slot of a predetermined axial length in the column tube for receiving a holding member which is axially integrally fixed to the steering shaft and extensible radially outward through the slot of the column tube for fixation thereto.

The above-mentioned second object is achieved by providing the support member in the form of a single integral structure. In addition, in order to allow mounting of the bearing, the support member is provided with claw portions which are expansible radially outward to receive bearings when they are pressed into position or with walls which are to be caulked after mounting the bearings to retain them in position.

BRIEF DESCRIPTION OF THE DRAWINGS

In the accompanying drawings:

FIG. 10 is a diagrammatic cutaway view showing still another embodiment of the present invention;

FIG. 11 is a diagrammatic view of the thrust stopper as seen in the direction of arrow XI in FIG. 10; and FIG. 12 is a diagrammatic cutaway view of a further embodiment of the present invention.

DESCRIPTION OF PREFERRED EMBODIMENTS

Figure 1:
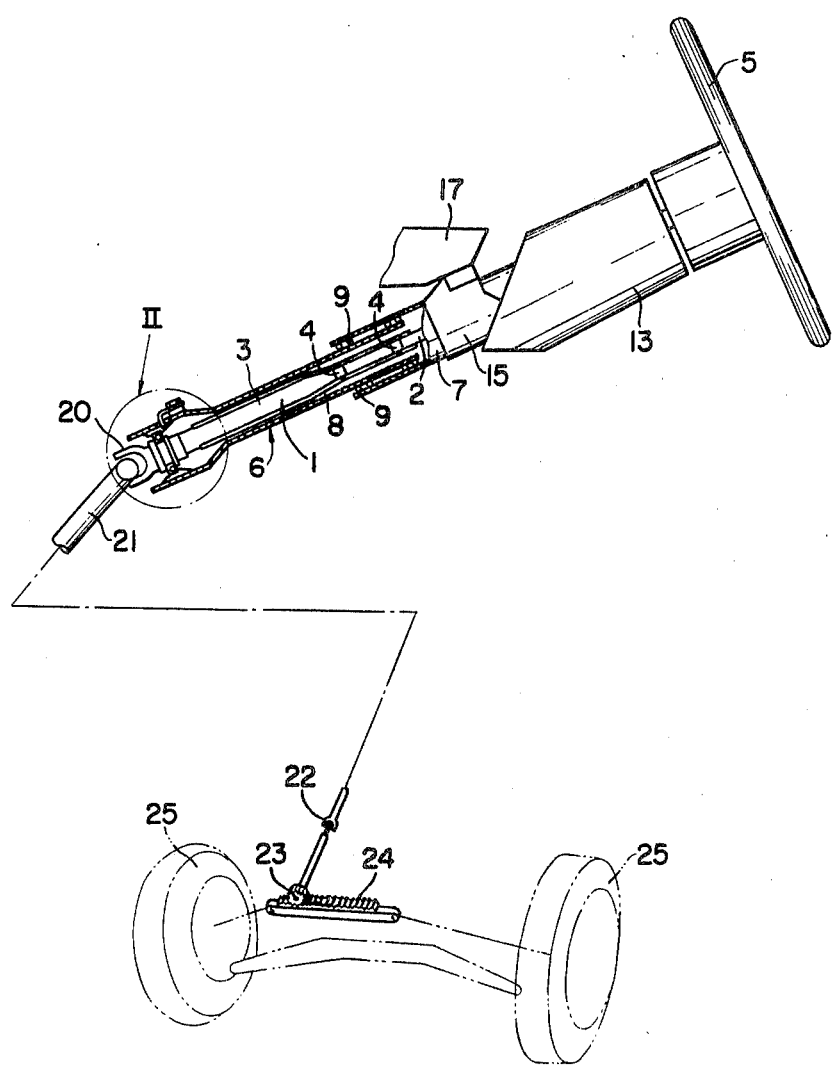
FIG. 1 is a diagrammatic view showing a steering system incorporating the present invention.
Figure 2:
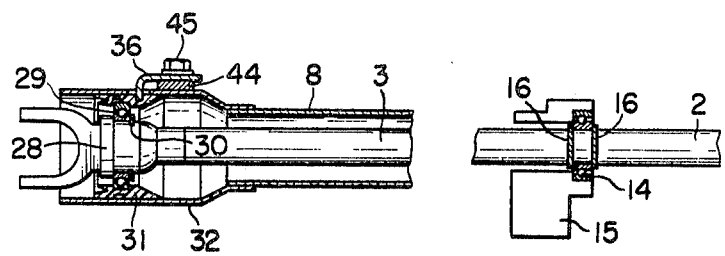
FIG. 2 is a fragmentary diagrammatic view showing the manner in which the steering shaft is supported at two axially distant positions in one embodiment of the present invention.

The invention is now described more particularly with reference to the accompanying drawings.

Referring to FIGS. 1 to 5, the steering shaft 1 comprises an upper shaft portion 2 and a lower shaft portion 3. The lower end of the upper shaft portion 2 is fitted into a bore at the upper end of the lower shaft portion 3. The upper and lower shaft portions 2 and 3 are connected with each other by a shear pin 4. The upper end of the upper shaft portion 2 is connected to a steering wheel 5 in the usual manner.

The steering shaft 1 is received in a column tube 6 which comprises an upper tube portion 7 and a lower tube portion 8. The upper and lower tube portions 7 and 8 are connected with each other through a damper cylinder with balls 9 of a predetermined diameter. In the event of a crash, the shear pin 4 is ruptured thereby plunging the upper shaft portion 2 into the hollow cavity of the lower shaft portion 3. On such an occasion, the upper and lower tube portions 7 and 8 are caused to undergo plastic deformation by the balls 9 to absorb the energy resulting from the crash.

A column cover 13 is attached to the upper end of the upper tube portion 7.

The outer race of bearing 14 is fixedly mounted on an upper bracket 15, with the inner race thereof being fixed on the upper shaft portion 2 through snap rings 16. The upper bracket 15 is mounted by bolts to the upper tube portion 7 and is connected to a pedal bracket 17 in the lower portion of the instrument panel.

Rotation of the steering wheel 5 is transmitted from the lower shaft portion 3 to vehicle wheels 25 through a universal joint 20, intermediate shaft 21, universal joint 22, pinion 23 and rack 24.

The lower shaft portion 3 is formed with a flange 28, and an inner race of bearing 29 is fixed in position against the flange 28 by a snap ring 30. An annular thrust stopper 31 of a synthetic resin material is mounted on the lower shaft portion 3 with its inner periphery fixed on the outer race of the bearings 29. The thrust stopper 31 is fitted in the enlarged or bulged portion 32 of the lower tube portion 8. An O-ring 33 is mounted between the enlarged portion 32 and the outer periphery of the thrust stopper 31.

Figure 4:
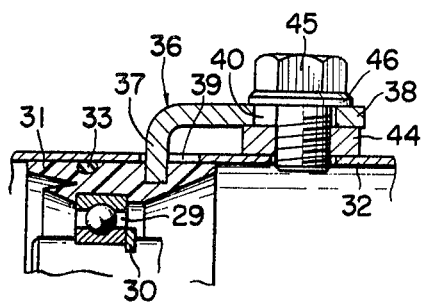
Figure 5:
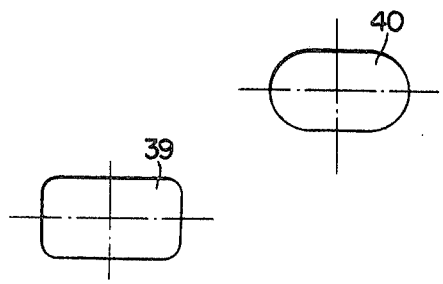
FIG. 5 is a diagrammatic view showing relative axial positions of the slot and bolt hole shown in FIG. 2.

There is mounted on the enlarged portion 32 a holding member 36 which has a radially extending portion 37 and an axially extending portion 38 (FIGS. 3 and 4), the radial portion 37 fixing the thrust stopper 31 in position. The holding member 36 extends radially outward through an axial slot 39 in the enlarged portion 36 of the lower tube portion 8. The axial portion 38 of the holding member 36 is provided with a bolt hole 40. FIG. 5 shows the shapes and relative axial positions of the slot 39 and the bolt hole 40 which have the same axial dimension.

An attachment 44 is securely fixed in a predetermined position on the outer periphery of the enlarged portion 32. The attachment 44 is provided with a threaded bore for receiving a bolt 45 which clamping fixes the holding member 36 to the attachment 44 through a washer 46. The washer 46 has an outer diameter sufficiently larger than the axial dimension of the bolt hole 40 for ensuring a predetermined area of contact with the holding member 36.

Figure 3:
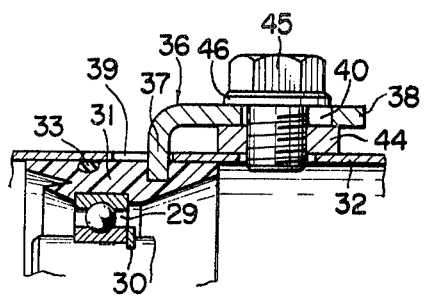
FIGS. 3 and 4 are diagrammatic cutaway views showing the relative positions of a holding member and a slot in the column tube in the cases where the axial dimension of the column tube is too short and too long relative to the steering shaft, respectively.

Prior to tightening the bolt 45, the steering shaft 1 and the column tube 6 are fixed to each other at the position of the bearing 14. As mentioned hereinbefore, the steering shaft 1 and column tube 6 have dimensional errors originating in the fabrication processes thereof, so that the position of the holding member 36 of the thrust stopper 31 relative to the slot 39 in the enlarged portion 32 and the attachment 44 differs from one assembly to the other. However, such dimensional errors are absorbed by the slot 39 and bolt hole 40 which are provided with allowances for positioning the radial portion 37 of the holding member 36 within the boundaries of the slot 39 and the threaded bore of the attachment 44 within the boundaries of the bolt hole 40 in spite of the dimensional errors. Thus, it becomes possible to pass the bolt 45 through the bolt hole 40 for clamping the holding member 36 to the attachment 44, irrespective of the errors in axial dimensions. FIG. 3 shows the position of the holding member 36 relative to the slot 39 and bolt 45 in a case where the column tube 6 is fabricated too short relative to the steering shaft 1. In FIG. 3, the radial portion 37 of the holding member 36 is located in the slot 39 at a position closer to the right end thereof and the bolt 45 in a position closer to the left end of the bolt hole 40. On the other hand, FIG. 4 shows the position of the holding member 36 relative to the slot 39 and bolt 45 in a case where the column tube 6 is fabricated too long relative to the steering shaft 1. In FIG. 4, the radial portion 37 of the holding member 36 is located in the slot 39 in a position closer to the left end thereof, and the bolt 45 in a position closer to the right end of the bolt hole 40. By tightening the bolt 45, the steering shaft 1 is supported by the column tube 6 at two axially spaced positions.

Figure 6:
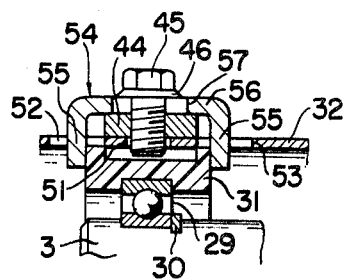
FIG. 6 is a diagrammatic cutaway view illustrating another embodiment of the present invention.
Figure 7:
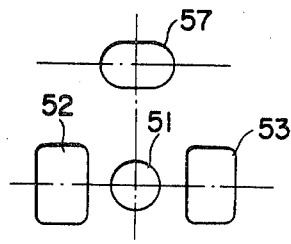
FIG. 7 is a diagrammatic view showing the shapes and relative axial positions of the slots and bolt hole in the embodiment of FIG. 6.

FIGS. 6 and 7 show another embodiment of the present invention. Referring to FIG. 6, the enlarged portion 32 is provided with a circular aperture 51 for receiving the bolt 45, along with slots 52 and 53 of a predetermined length which are formed axially on opposite sides of the circular aperture 51. A holding member 54 of U-shape in section has two downwardly extending end wall portions 55 contiguously at opposite sides of an intermediate portion 56. The holding member 54 is fixed to the thrust stopper 31 with the end portions 55 received in the slots 52 and 53. The intermediate portion 56 is formed with a bolt hole 57 of a predetermined axial length. The shapes and relative axial positions of the circular aperture 51, slots 52 and 53, and bolt hole 57 are shown in FIG. 7. Errors in axial dimensions of the steering shaft 1 and column tube 6 are absorbed by axial lengths of the slots 52 and 53 and bolt hole 57. As a result, notwithstanding the errors in axial dimensions, the holding member 54 can be fixed on the thrust stopper 31 with the end portions 55 disposed within the slots 52 and 53, and the bolt 45 can be passed through the bolt hole 57 and threaded into the attachment 44.

Figure 8:
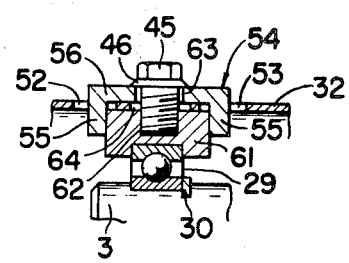
FIG. 8 is a diagrammatic cutaway view illustrating a modification of the embodiment shown in FIG. 6.
Figure 9:
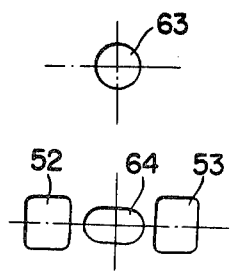
FIG. 9 is a diagrammatic view showing the shapes and relative axial positions of the slots and bolt hole in the embodiment of FIG. 8.

FIGS. 8 and 9 illustrate a modification of the embodiment of FIGS. 6 and 7. In this modification, a thrust stopper 61, which corresponds to the thrust stopper 31 of the foregoing embodiment, is formed of a metal and provided with a tapped hole 62 to omit an attachment 44 which would otherwise be provided on the enlarged portion 32. The holding member 54 is provided with a circular hole 63 in the intermediate section 56 for receiving the bolt 45. The enlarged portion 32 is provided with a bolt receiving slot 64 of a predetermined axial length between the side slots 52 and 53. The shapes and the relative axial positions of the bolt receiving circular hole 63 and slot 64 are shown in FIG. 9. No matter whether the steering shaft 1 or column tube 6 has a dimensional error, the bolt 45 can be passed through the slot 64 and tightened to clamp the holding member 54 and the thrust stopper 61 in position on opposite sides of the enlarged portion 32.

The afore-mentioned second object of the present invention is achieved by the embodiments shown in FIGS. 10 through 12. In FIG. 10, the thrust stopper 31 is constituted by a structure of a synthetic resin material. The bearing 29 has its inner race fixed in position by snap ring 30 contiguously to the flange 28 of the lower shaft portion 3. The outer race of the bearing 29 is fitted in an annular groove in the inner periphery of the thrust stopper 31. The radial force from the lower shaft portion 3 is received by the enlarged portion 32 through the thrust stopper 31. The thrust stopper 31 is provided with a claw portion 72 of a predetermined length which extends axially from the afore-mentioned annular groove 71, forming an annular gap 74 between the claw portion 72 and an outer peripheral portion 73 which is in contact with the inner periphery of the enlarged portion 32, thereby to allow the claw portion 72 to outstretch or expand radially outward. The edge of the stepped portion between the annular groove 71 and the claw portion 72 is rounded in an arcuate shape as shown at 75. In the particular embodiment shown, four claw portions 72 are provided in four equidistant positions on the inner periphery of the thrust stopper 31 as shown in FIG. 11. The claw portions 72 are protruded radially inward of the outer race of the bearing 29 which is fixed in position. In other words, the minimum inside diameter defined by the claw portions is smaller than the outside diameter 76 of the bearing 29 defined by the outer race thereof. In the embodiment shown in FIG. 10, the claw portions 72 diverged in the direction away from the annular groove 71 as seen in FIG. 10 to facilitate the insertion of the bearing 29 which is to be fitted into the annular groove 71 through the claw portions 72. Upon pressing in the bearing 29, the claw portions 72 of the thrust stopper 31 are expanded radially outward, allowing the bearing 29 to be fitted into the annular groove 71. As soon as the bearing 29 is pressed into the annular groove 71, the claw portions 72 owing to the resiliency thereof return to the respective positions radially inward of the outer periphery of the bearing 29. In this manner, the bearing 29 is fixed in the thrust stopper 31. The rounded shoulder portion 75 prevents rickety movements of the bearing 29 and fixes same securely in the annular groove 71. The thrust forces, mainly the axially upwardly acting thrust forces which are imposed on the steering shaft 6 through the intermediate shaft 21, act on the stepped portion of the annular groove 71 at the side opposite to the round-edged stepped portion 75. On the other hand, the opposite thrust force is imposed on the round-edged stepped portion 75 by the bearing 29 being disengaged from the thrust stopper 31. The maximum allowable value of the thrust force which can be exerted on the round-edged stepped portion 75 by the bearing 29 without its disengagement is determined by the radius of the round-edged portion 75.

Since the thrust stopper 31 is constituted by a single structure, it has no possibility of being disassembled by the forces exerted by the bearing 29 and holding member 36.

FIG. 12 shows still another embodiment of the present invention, wherein those component parts which are common to the embodiment of FIGS. 10 and 11 are designated by common reference numerals to avoid repeated explanation, and the following description is directed only to the different parts. The thrust stopper 31 is formed of iron or a synthetic resin material and provided with caulkable wall portions 78 instead of the claw portions 72 of the foregoing embodiment. The wall portions 78 are caulked by heat or by a roller after fitting the bearing 29 in the annular groove 71 for fixation of the bearing 29. The thrust stopper 31 which is constituted by a single structure is free from the trouble of disintegration due to the forces exerted thereto in certain degrees by the outer race of the bearing 29 and the holding member 36.

It will be appreciated from the foregoing description that the present invention provides a support member in the form of a thrust stopper which is constituted by a single structure to prevent disassembling or disintegration which would otherwise be caused by the forces exerted thereto by the bearing 29 and holding member 36. In addition, the thrust stopper 31 of a single structure is capable of securely fixing the action of the claw portions 72 or by the caulked wall portions.

What is claimed is:

1. A steering shaft support comprising:
a steering shaft accommodated within a column tube,
a one-piece annular support member disposed in said column tube and fixed on said steering shaft through a bearing, and
a holding device fixed to the outer surface of said column tube and having a portion thereof extending through an elongated slot of a predetermined axial length in said column tube, said portion fixedly engaging said support member in position within said column tube.

2. A steering shaft support device as defined in claim 1, wherein said support member is provided with claw portions extending in a direction opposite to the direction in which said bearing is pressed into said support member, said claw portions being expansible radially outwardly upon pressing said bearing into said support member.

3. A steering shaft support device as defined in claim 1, wherein said support member is provided with wall portions to be caulked after pressing said bearing into said support member.

* * * * *